US012384661B2

(12) United States Patent
Sparks, II

(10) Patent No.: US 12,384,661 B2
(45) Date of Patent: Aug. 12, 2025

(54) BELT DRIVE FOR USE WITH A VACUUM MATERIAL HANDLER

(71) Applicant: Vacuworx Global, LLC, Tulsa, OK (US)

(72) Inventor: Keith A. Sparks, II, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 281 days.

(21) Appl. No.: 17/912,209

(22) PCT Filed: Mar. 19, 2021

(86) PCT No.: PCT/US2021/023200

§ 371 (c)(1),
(2) Date: Sep. 16, 2022

(87) PCT Pub. No.: WO2021/188925

PCT Pub. Date: Sep. 23, 2021

(65) Prior Publication Data

US 2023/0126647 A1 Apr. 27, 2023

Related U.S. Application Data

(60) Provisional application No. 62/991,869, filed on Mar. 19, 2020.

(51) Int. Cl.
*B66C 1/02* (2006.01)

(52) U.S. Cl.
CPC .......... *B66C 1/0281* (2013.01); *B66C 1/0256* (2013.01); *B66C 1/0293* (2013.01)

(58) Field of Classification Search
CPC .... B66C 1/0281; B66C 1/0256; B66C 1/0293
USPC .......... 414/814
See application file for complete search history.

(56) References Cited

U.S. PATENT DOCUMENTS

| | | | | |
|---|---|---|---|---|
| 3,694,020 | A | 9/1972 | Becker et al. | |
| 9,896,892 | B2 * | 2/2018 | Solomon | E21B 19/155 |
| 10,163,334 | B1 * | 12/2018 | Capps | B66C 1/0262 |
| 2010/0183415 | A1 | 7/2010 | Solomon et al. | |
| 2010/0219651 | A1 | 9/2010 | Walter et al. | |
| 2016/0244301 | A1 | 8/2016 | Prindiville | |
| 2018/0094728 | A1 * | 4/2018 | Denton | F16J 15/102 |

FOREIGN PATENT DOCUMENTS

| | | | |
|---|---|---|---|
| EP | 1462630 | A1 | 9/2004 |
| RU | 992381 | A1 | 1/1983 |

* cited by examiner

*Primary Examiner* — Glenn F Myers
(74) *Attorney, Agent, or Firm* — GableGotwals

(57) ABSTRACT

A system and method for moving objects such as drill, pipe with vacuum power. A vacuum beam (14) is mounted on a boom. A vacuum pad (12) is pivotally attached to the vacuum beam (14). A power device (18) is operatively connected to a vacuum pump (16) with a drive belt (32) for creating vacuum pressure. Vacuum pressure from the vacuum pad (12) is used to grasp and release the object, e.g., the drill pipe.

10 Claims, 4 Drawing Sheets

BELT DRIVE FOR USE WITH A VACUUM MATERIAL HANDLER

CROSS REFERENCE TO RELATED APPLICATION

This application is the National Phase of PCT Application No. PCT/US2021/023200 filed 19 Mar. 2021 which claims the benefit of U.S. Provisional Application No. 62/991,869 entitled BELT DRIVE FOR USE WITH A VACUUM MATERIAL HANDLER filed Mar. 19, 2020, herein incorporated by reference in its entirety for all purposes.

FIELD OF THE INVENTION

The present invention relates generally to a vacuum handler for pipe. More particularly, the present invention relates to a vacuum handler for drill pipe having a belt drive for improved operation.

BACKGROUND OF THE INVENTION

An effective method of handling pipe is via a vacuum handler. One example of a vacuum handler is taught in U.S. Pat. No. 9,896,892 to Solomon et al. and assigned to Vacuworx Global, LLC. The vacuum handler described in the '892 patent utilizes vacuum beam mounted on a boom. The vacuum handler has a vacuum pad that is attached to the vacuum beam. Lateral movement of the vacuum pad relative to the vacuum beam is provided by one or more pinned connections located adjacent to a hinge. Vacuum pressure from the vacuum pad is used to grasp and release drill pipe.

Use, of a vacuum handler provides for a system and method to handle objects, such as drill pipe, that minimizes worker injuries and damage to objects and equipment.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

SUMMARY OF THE INVENTION

The present invention achieves its objectives by providing a system and method for moving objects such as drill pipe with vacuum power. The system is used with vacuum material handler having a vacuum beam mounted on a boom. The system has a vacuum pad that is attached to the vacuum beam. Vacuum pressure from the vacuum pad is used to grasp and release objects such as drill pipe.

The vacuum material handler provides a system and method to handle objects, such as drill pipe for directional drilling, which minimizes worker injuries and damage to objects and equipment.

The vacuum material handler includes a vacuum beam having a lower end and a vacuum pad proximate the lower end of the vacuum beam. A power device, such as an internal combustion engine, is carried by the vacuum beam. The power device has an output shaft that may have an output pulley. A vacuum pump is also carried by the vacuum beam. The vacuum pump has an input shall that may have in an input pulley. A belt may be received on the output and input pulleys. The belt spans between the output shaft of the power device and the input shaft of the vacuum pump for transmitting power from the power device to the vacuum pump. In one embodiment, the output pulley defines a plurality of teeth, the input pulley defines a plurality of teeth and the belt is a toothed drive belt for engaging the teeth defined by the output pulley and the input pulley. A belt tensioner pulley may be provided in between the output shall of the power device and the input shall of the vacuum pump. A timing belt and auto tensioner are utilized to eliminate the need to rely on an individual's intuition as to whether or not the belt is tight enough. The belt tensioner is a non-slip, self-adjusting belt arrangement. The belt tensioner pulley is provided for ensuring proper tensioning of the belt. A cover is preferably provided for enclosing the output pulley, the input pulley and the belt.

In use, the vacuum pad is lowered over an object, such as drill pipe. The vacuum pad is rotationally aligned with the object. A vacuum seal is created between the vacuum pad and the object by powering the vacuum pump in the vacuum beam with the power device, wherein the power device delivers power to the vacuum pump via a belt.

Benefits associated with the use a belt over other methods of power transmission include increased reliability, lighter weight, longer maintenance intervals, relative ease of repair, a lower cost of outsourced goods and increased workforce utilization, elimination of oil in a gearbox that must be changed thereby increasing environmental friendliness, cooler engine bay, dampening of engine power pulses resulting in less wear on the driven pump.

DETAILED DESCRIPTION OF THE PREFERRED EMBODIMENTS

Figure 1:
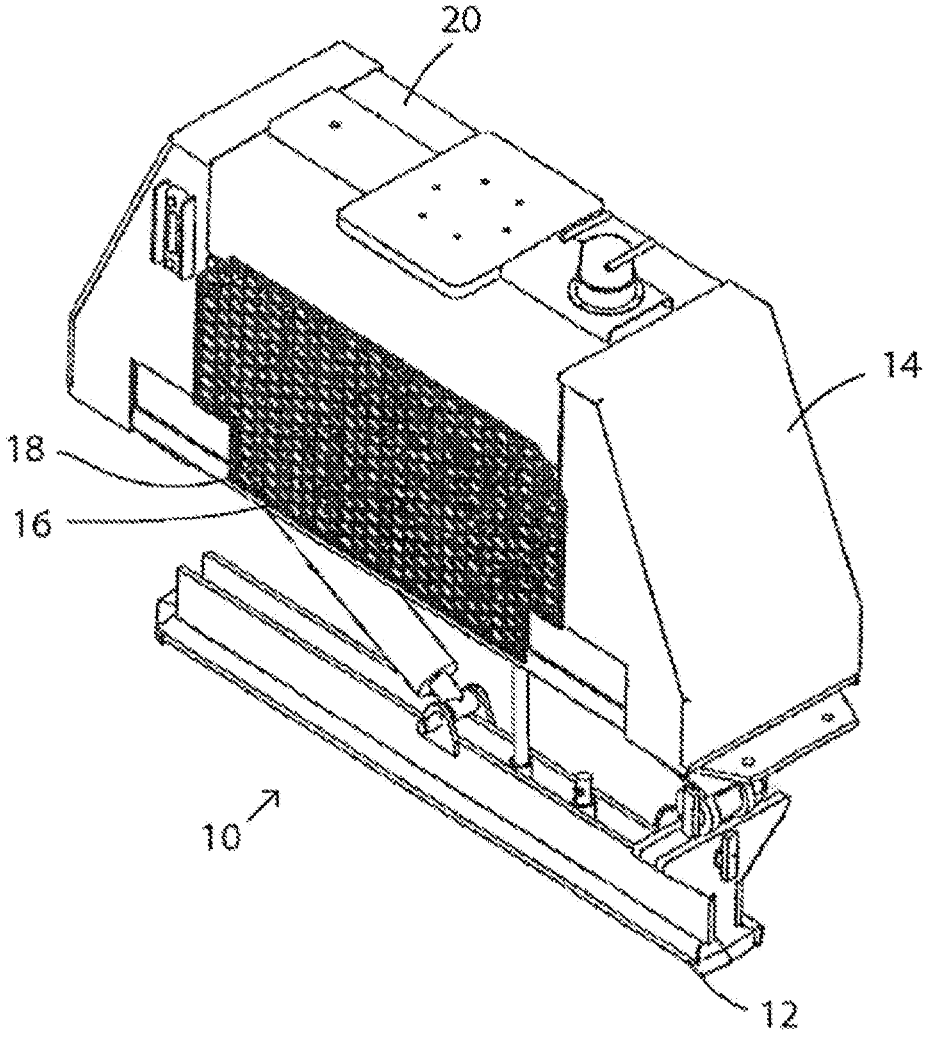
FIG. 1 is a perspective view of one embodiment of the vacuum material handler of the invention mounted to a vacuum beam.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed a limiting the scope of the claimed invention.

The present invention provides sale and effective system and method for handling drill pipe using a vacuum material handler designated generally 10. Vacuum handler 10 may be mounted on an excavator or other boom. In one embodiment, vacuum pad 12 is mounted to vacuum beam 14. Vacuum beam 14 may be connected to the excavator with a rotator (not shown) capable of rotating beam 14 relative to the boom.

Vacuum for vacuum pad 12 is supplied by a vacuum pump 16 mounted on the beam 14. Vacuum pump 16 is powered by a power device 18, such as engine, pump, or motor. For example, vacuum pump 16 may be powered by an internal combustion engine located in vacuum beam 14. In one embodiment, vacuum pump 16 may be powered by a hydraulic pump, which, in turn, is powered by hydraulic fluid from a boom carrying vehicle such as an excavator.

Vacuum beam 14 also carries vacuum reservoir 20 that is in fluid communication with vacuum pump 16 and vacuum pad 12. Vacuum reservoir 20 provides additional time for the operator to react to an event Involving interruption of vacuum pump 16.

Figure 3:
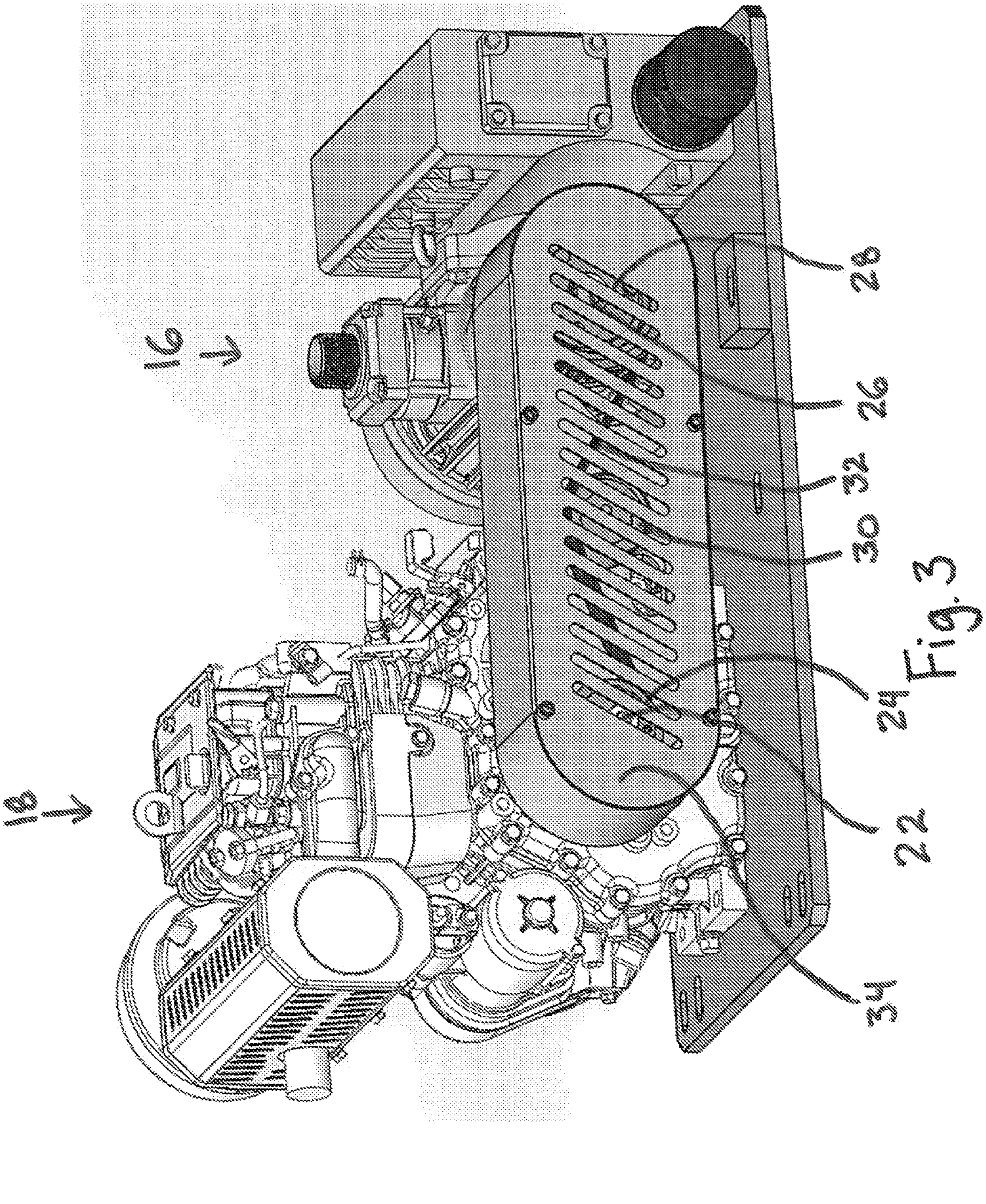
FIG. 3 is a perspective view of the power device and pump of the FIGS. 1 and 2 operatively connected with a drive belt wherein the drive belt is surrounded by a cover.
Figure 4:
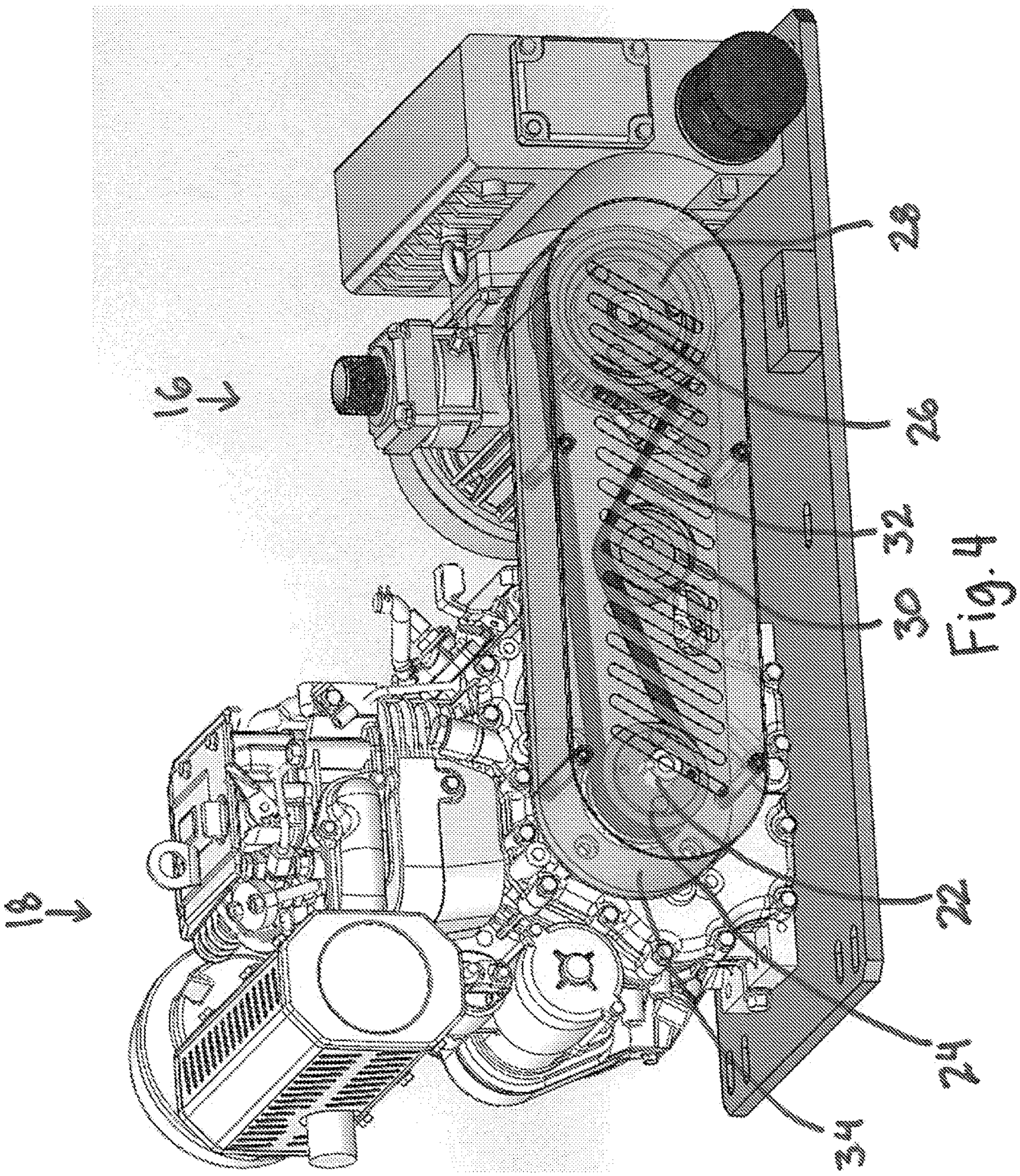
FIG. 4 is a perspective view of the power device and pump of the FIG. 3 with cover removed.

Referring now primarily to FIGS. 3 and 4, power device 18 preferably includes output shaft 22, which carries output pulley 24. Vacuum pump 16 preferably includes input shaft 26, which carries input pulley 28. Belt tensioner pulley 30 may be provided to ensure proper tensioning of belt 32. In one embodiment, belt 32 is a toothed drive belt for engaging teeth defined by output pulley 24 and for engaging teeth defined by input pulley 28. Belt 32, output pulley 24 and input pulley 28 are preferably enclosed within cover 34.

Figure 2:
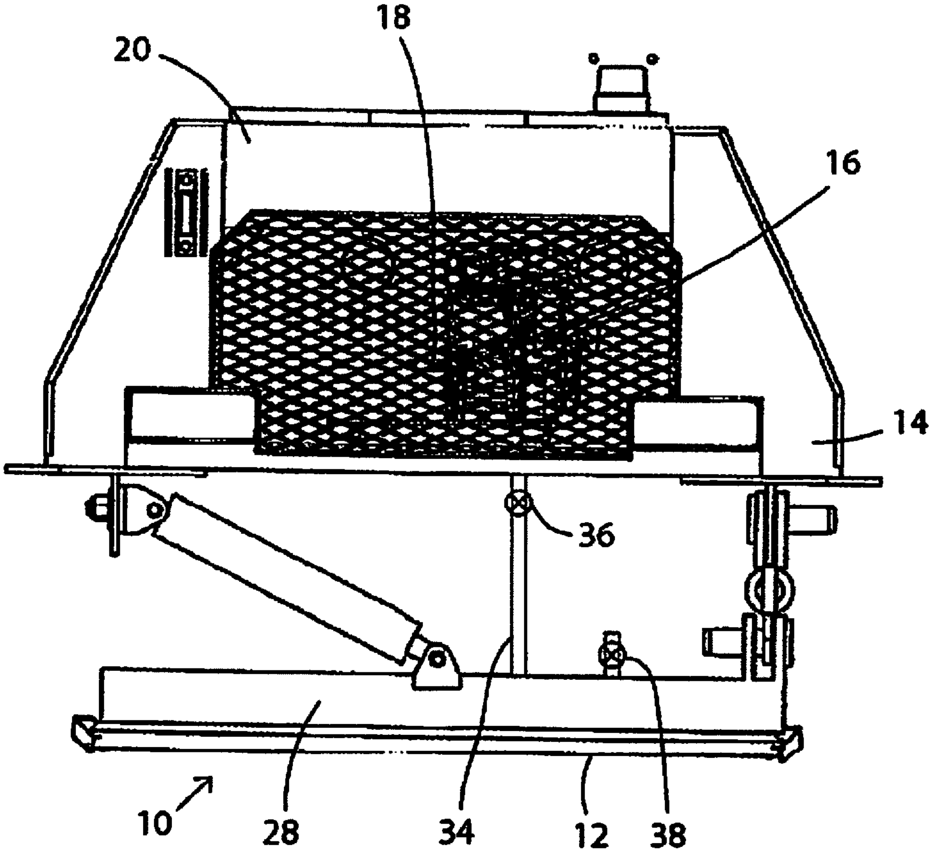
FIG. 2 is a side view of one embodiment of the vacuum material handler of the FIG. 1 mounted to a vacuum beam.

Referring now primarily to FIG. 2, vacuum line 34 connects vacuum pad 12 to vacuum pump 16 and vacuum reservoir 20. Thus, all three of vacuum pad 12, vacuum pump 16, and vacuum reservoir 20 are in fluid communication with one another. First solenoid operated valve 36 provides a way to isolate vacuum pad 12 from vacuum pump 16 and vacuum reservoir 20. A second solenoid operated valve 38 is capable of opening vacuum pad 12 to the atmosphere for releasing the vacuum pressure between the vacuum pad 12 and the pipe being manipulated.

In operation, an excavator operator lowers vacuum beam 14 and vacuum pad 12 over an object such as a drill pipe. Using a rotator, vacuum pad 12 is rotated to align with the drill pipe. Vacuum pad 12 is then brought into contact with the drill pipe. A vacuum seal is created between vacuum pad 12 and the drill pipe. The vacuum seal is accomplished by opening first solenoid operated valve 36 for bringing vacuum pump 16 and/or vacuum reservoir 20 into fluid communication with vacuum pad 12. Once the drill pipe is secured to the vacuum pad 12 by vacuum pressure, vacuum beam 14, vacuum pad 12 and drill pipe are lifted and moved into position with the directional drilling machine through movement of the boom and rotator.

In one example, once a directional drilling machine secures the pipe, the pipe is released from vacuum pad 12. This is accomplished by closing the first solenoid operated valve 36 between vacuum pad 12 and vacuum pump 16 and vacuum reservoir 20. A second solenoid operated valve 38 on the vacuum pad 12 is then opened to atmosphere. This terminates the vacuum between the vacuum pad 12 and the pipe.

The foregoing description details certain preferred embodiments of the present invention and describes the best mode contemplated. It will be appreciated, however, that changes may be made in the details of construction and the configuration of components without departing from the spirit find scope of the disclosure. Therefore, the description provided herein is to be considered exemplary, rather than limiting, and the true scope of the invention is that defined by the following claims and the full range of equivalency to which each element thereof is entitled.

It is to be understood that the terms “including”, “comprising”, “consisting” and grammatical variants thereof do not preclude the addition of one or more components, features, steps, or integers or groups thereof and that the terms are to be construed as specifying components, features, steps or integers.

If the specification or claims refer to “an additional” element, that does not preclude there being more than one of the additional element.

It is to be understood that where the claims or specification refer to “a” or “an” element, such reference is not be construed that there is only one of that element.

It is to be understood that where the specification states that a component, feature, structure, or characteristic “may”, “might”, “can” or “could” be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term “method” may refer to manners, means, techniques and procedures for accomplishing a given task including, but not limited to, those manners, means, techniques and procedures either known to, or readily developed from known manners, means, techniques and procedures by practitioners of the art to which the invention belongs.

The term “at least” followed by a number is used herein to denote the start of a range beginning with that number (which may be a ranger having an upper limit or no upper limit, depending on the variable being defined). For example, “at least 1” means 1 or more than 1. The term “at most” followed by a number is used herein to denote the end of a range ending with that number (which may be a range having 1 or 0 as its lower limit or a range having no lower limit depending upon the variable being defined). For example, “at most 4” means 4 or less than 4, and “at most 40%” means 40% or less than 40%. Terms of approximation (e.g, “about”, “substantially”, “approximately”, etc.) should be interpreted according to their ordinary and customary meanings as used in the associated art unless indicated otherwise. Absent a specific definition and absent ordinary and customary usage in the associated art, such terms should be interpreted to be a ±10% of the base value.

When, in this document, a range is given as “(a first number) to (a second number)” or “(a first number)-(a second number)”, this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g. 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed:

1. A vacuum material handler (10) comprising:

a vacuum beam (14) having a lower end;

a vacuum pad (12) proximate said lower end of said vacuum beam (14);

a power device (18) carried by said vacuum beam (14), said power device (18) having an output shaft (22);

a vacuum pump (16) carried by said vacuum beam (14), said vacuum pump (16) having an input shaft (26);

a belt (32) spanning between said output shaft (22) of said power device (18) and said input shaft (26) of said vacuum pump (16) for transmitting power from said power device (18) to said vacuum pump (16);

an output pulley (24) affixed to said output shaft (22) of said power device (18);

an input pulley (28) affixed to said input shaft (26) of said vacuum pump (16);

wherein said belt (32) spans between said output pulley (24) and said input pulley (28);

said output pulley (24) defines a plurality of teeth;

said input pulley (28) defines a plurality of teeth; and said belt (32) is a toothed drive belt for engaging teeth defined by output pulley (24) and for engaging teeth defined by said input pulley (28).

2. The vacuum material handler (10) according to claim 1 wherein:

said power device (18) is an internal combustion engine.

3. The vacuum material handler (10) according to claim 1 further comprising:

a belt tensioner pulley (30) in between said output shaft (22) of said power device (18) and said input shaft (26) of said vacuum pump (16), said belt tensioner pulley (30) for ensuring proper tensioning of said belt (32).

4. The vacuum material handler (10) according to claim 1 further comprising:

a cover (34) for enclosing said output pulley (24), said input pulley (28) and said belt (32).

5. A method of lifting an object:

lowering a vacuum pad (12) carried by a vacuum beam (14) over the object;

aligning said vacuum pad (12) with the object;

creating a vacuum seal between said vacuum pad (12) and the object by powering a vacuum pump (16) in said vacuum beam (14) with a power device (18), wherein said power device (18) delivers power to said vacuum pump (16) via a belt (32);

wherein said belt (32) spans between an output pulley (24) of said power device (18) and an input pulley (28) of said vacuum pump (16);

said power device (18) has an output pulley (24) defining a plurality of teeth;

said vacuum pump (16) has an input pulley (28) defining a plurality of teeth; and said belt (32) is a toothed drive belt for engaging teeth defined by output pulley (24) and for engaging teeth defined by said input pulley (28).

6. The method according to claim 5 wherein:

said power device (18) is an internal combustion engine.

7. The method according to claim 5 further comprising a step of:

tensioning said belt (32) with a belt tensioner pulley (30) in between an output shaft (22) of said power device (18) and an input shaft (26) of said vacuum pump (16) for ensuring proper tensioning of said belt (32).

8. The method of claim 5 wherein:

said vacuum pump (16) is in fluid communication with a reservoir (20), and a solenoid operated valve (36) is configured to isolate said vacuum pad (12) from said vacuum pump (16) and said reservoir (20), and said vacuum seal is accomplished by opening the valve (36).

9. The vacuum handler of claim 1 further comprising:

a reservoir (20) in fluid communication with the vacuum pump (16) and the vacuum pad (12).

10. The vacuum handler of claim 9 further comprising:

a solenoid operated valve (36) configured to isolate said vacuum pad (12) from said vacuum pump (16) and said reservoir (20), said valve (36) being configured to accomplish a vacuum seal between said vacuum pad (12) and a load object.

* * * * *